Figure 1:
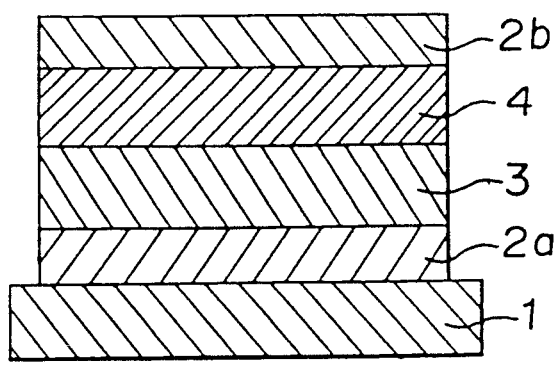

United States Patent [19]

Tashiro et al.

[11] Patent Number: 5,059,863

[45] Date of Patent: Oct. 22, 1991

[54] ORGANIC ELECTROLUMINESCENT DEVICE

[75] Inventors: Masashi Tashiro, Dazaifu; Shuntaro Mataga, Onojyo; Kazufumi Takahashi, Kasuga; Shogo Saito, Fukuoka; Tetsuo Tsutsui, Kasuga; Chihaya Adachi, Onojyo; Yoshiharu Sato, Sagamihara; Shuichi Maeda, Hidaka, all of Japan

[73] Assignee: Mitsubishi Kasei Corporation, Tokyo, Japan

[21] Appl. No.: 547,147

[22] Filed: Jul. 3, 1990

[30] Foreign Application Priority Data

Jul. 4, 1989 [JP] Japan .................................. 1-172176
Jul. 4, 1989 [JP] Japan .................................. 1-172177
Dec. 28, 1989 [JP] Japan .................................. 1-343982

[51] Int. Cl.⁵ .................... H05B 33/14; C09K 11/06; B32B 19/00
[52] U.S. Cl. .............................. 313/504; 252/301.26; 428/690; 428/917
[58] Field of Search .................. 313/504; 252/301.26; 428/690, 917

[56] References Cited

U.S. PATENT DOCUMENTS 4,356,429 10/1982 Tang ..................................... 313/503
4,539,507 9/1985 VanSlyke et al. .................... 313/504
4,769,292 9/1988 Tang et al. ............................ 313/504

FOREIGN PATENT DOCUMENTS 51781 3/1982 Japan .
194393 9/1984 Japan .
243393 5/1989 Japan .

OTHER PUBLICATIONS

Tang et al., *Appl. Phys. Lett.* 51(12), 913-915 (21 Sep. 1987).

Tang et al., *J. Appl. Phys.* 65(9), 3610-3616 (1 May 1989).

Adachi et al., *Japanese J. Appl. Phys.* 27(4), L713-L715 (Apr. 1988).

Adachi et al., *Japanese J. Appl. Phys.* 27(2), L269-L271 (Feb. 1988).

*Primary Examiner*—Sandra L. O'Shea
*Attorney, Agent, or Firm*—Oblon, Spivak, McClelland, Maier & Neustadt

[57] ABSTRACT

An organic electroluminescent device having an organic hole injection transport layer and an organic luminescent layer formed between two conductive layers constituting electrodes, wherein the organic luminescent layer contains a compound selected from the group consisting of a compound of the following formula (I):

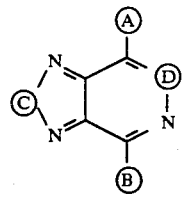

(I)

wherein each of Ⓐ and Ⓑ is an aromatic hydrocarbon group which may have a substituent, Ⓒ is a nitrogen atom which may have a substituent, a sulfur atom, an oxygen atom, or a selenium atom, and Ⓓ is a nitrogen atom, or a carbon atom which may have a substituent; a compound of the following formula (II):

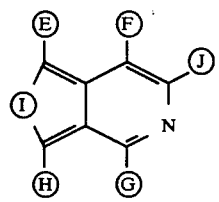

(II)

wherein each of Ⓔ, Ⓕ, Ⓖ and H is an aromatic hydrocarbon group which may have a substitutent, Ⓘ is a nitrogen atom which may have a substituent, a sulfur atom, an oxygen atom, or a selenium atom, and Ⓙ is a hydrogen atom, a cyano group, an amide group, an ester group, an alkyl group, a carboxyl group, an (Abstract continued on next page.)

aromatic hydrocarbon group which may be substituted, or an aromatic heterocyclic group which may be substituted; and a compound having at least one group selected from the group consisting of aromatic hydrocarbon cyclic groups and aromatic heterocyclics groups, bonded directly, or via other group, to a naphthyridine skeleton of the following formula:

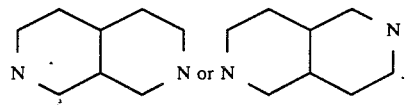

9 Claims, 1 Drawing Sheet

ORGANIC ELECTROLUMINESCENT DEVICE

The present invention relates to an organic electroluminescent device. More particularly, it relates to a thin-film type device comprising a combination of a hole injection transport layer and a luminescent layer made of organic compounds, respectively, which is designed to emit light upon application of an electric field.

Heretofore, it has been common that thin-film type electroluminescent devices are made of inorganic material which is obtained by doping a semiconductor of a Group II-VI compound such as ZnS, CaS or SrS with Mn or a rare earth element (such as Eu, Ce, Tb or Sm) as the luminous center. However, the electroluminescent devices prepared from such inorganic material, have problems such that 1) alternate current driving is required (about 1 KHz), 2) the driving voltage is high (about 200 V), 3) it is difficult to obtain full coloring, and 4) the cost for peripheral driving circuits is high.

In order to overcome such problems, there have been activities, in recent years, to develop electroluminescent devices using organic materials. As the materials for the luminescent layer, in addition to anthracene and pyrene which were already known, cyanine dyes (J. Chem. Soc., Chem. Commun., 557, 1985), pyrazoline (Mol. Cryst. Liq. Cryst., 135, 355, (1986)), perylene (Jpn. J. Appl. Phys., 25, L773, (1986)) or coumarin compounds and tetraphenylbutadiene (Japanese Unexamined Patent Publication No. 51781/1982), have been reported. Further, it has been proposed to optimize the type of electrodes or to provide a hole injection transport layer and a luminescent layer composed of an organic phosphor, for the purpose of improving the injection efficiency of a carrier from the electrodes in order to increase the luminous efficiency (Japanese Unexamined Patent Publications No. 51781/1982, No. 194393/1984 and No. 295695/1988). However, with the organic electroluminescent devices disclosed in these references, the light emitting performance is still inadequate. And further improvements are desired.

It is an object of the present invention to provide an organic electroluminescent device using an organic luminescent compound capable of emitting light with high luminance even at a low driving voltage.

Thus, the present invention provides an organic electroluminescent device having an organic hole injection transport layer and an organic luminescent layer formed between two conductive layers constituting electrodes, wherein the organic luminescent layer contains a compound selected from the group consisting of a compound of the following formula (I):

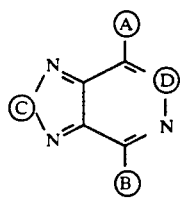
(I)

wherein each of Ⓐ and Ⓑ is an aromatic hydrocarbon group which may have a substituent, Ⓒ is a nitrogen atom which may have a substituent, a sulfur atom, an oxygen atom, or a selenium atom, and Ⓓ is a nitrogen atom, or a carbon atom which may have a substituent; a compound of the following formula (II):

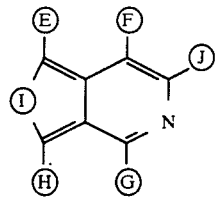
(II)

wherein each of Ⓔ, Ⓕ, Ⓖ and Ⓗ is an aromatic hydrocarbon group which may have a substituent, Ⓘ is a nitrogen atom which may have a substituent, a sulfur atom, an oxygen atom, or a selenium atom, and Ⓙ is a hydrogen atom, a cyano group, an amide group, an ester group, an alkyl group, a carboxyl group, an aromatic hydrocarbon group which may be substituted, or an aromatic heterocyclic group which may be substituted; and a compound having at least one group selected from the group consisting of aromatic hydrocarbon cyclic groups and aromatic heterocyclics groups, bonded directly, or via other group, to a naphthyridine skeleton of the following formula:

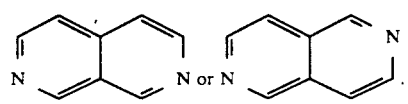

Now, the electroluminescent device of the present invention will be described with reference to the accompanying drawings.

Figure 2:
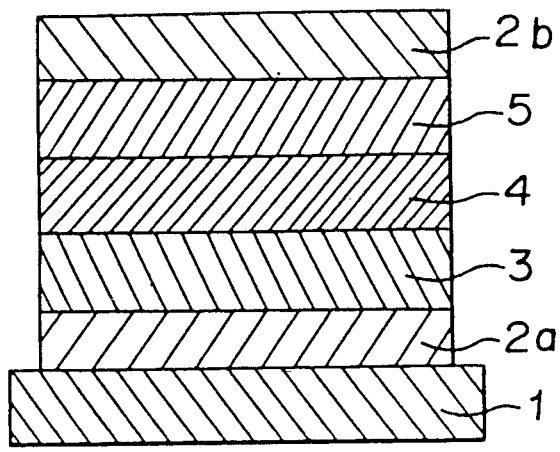

FIGS. 1 and 2 are a cross sectional views schematically illustrating the structures of electroluminescent devices of the present invention, in which reference numeral 1 indicates a substrate, numerals 2a and 2b indicate conductive layers, numeral 3 indicates a hole injection transport layer, numeral 4 indicates a luminescent layer and numeral 5 indicates an electron injection transport layer.

The substrate 1 constitutes a support for the electroluminescent device of the present invention and may be made of a quartz or glass sheet, a metal sheet or foil, or a plastic film or sheet. However, it is preferred to employ a glass sheet or a substrate made of a transparent synthetic resin such as polyester, polymethacrylate, polycarbonate or polysulfone. On the substrate 1, a conductive layer 2a is provided. Such a conductive layer 2a is usually made of a metal such as aluminum, gold, silver, nickel, palladium or tellurium, a metal oxide such as an oxide of indium and/or tin, copper iodide, carbon black or a conductive resin such as poly(3-methylthiophene). The conductive layer is usually formed by sputtering or vacuum deposition. However, in the case of fine particles of a metal such as silver, copper iodide, carbon black, fine particles of conductive metal oxide or fine conductive resin powder, such material may be dispersed in a suitable binder resin solution and coated on a substrate to form the conductive layer. Further, in the case of a conductive resin, a thin film may directly be formed on a substrate by electrolytic polymerization.

This conductive layer may be made to have a multilayered structure by depositing different types of materials among the above mentioned materials. The thickness of the conductive layer 2a varies depending upon the required transparency. When transparency is required, the transmittance of visible light is usually at least 60%, preferably at least 80%. In such a case, the thickness of the conductive layer is usually from 50 to 10,000 Å, preferably from 100 to 5,000 Å. When it may be opaque, the conductive layer 2a may also serve as the substrate 1. Also in this case, the conductive layer may be made to have a multi-layered structure of different types of materials, as mentioned above.

In the embodiment of FIG. 1, the conductive layer 2a plays a hole injection role as an anode.

On the other hand, the conductive layer 2b plays a role of injecting electrons to the luminescent layer 4 as a cathode. As the material to be used as the conductive layer 2b, the same material as mentioned above with respect to the conductive layer 2a, may be employed. However, in order to promote the electron injection efficiently, it is preferred to employ a metal having a low value of work function. In this respect, a suitable metal such as tin, magnesium, indium, aluminum or silver, or their alloys may be employed. The thickness of the conductive layer 2b is usually the same as the conductive layer 2a. Although not shown in FIG. 1, a substrate like the substrate 1 may further be provided on the conductive layer 2b. However, at least one of the conductive layers 2a and 2b is required to have good transparency for an electroluminescent device. In this respect, one of the conductive layers 2a and 2b is desired to have good transparency preferably with a thickness of from 100 to 5,000 Å.

On the conductive layer 2a, a hole injection transport layer 3 is formed. The hole injection transport layer 3 is formed of a compound which is capable of efficiently transporting a hole from the anode towards the luminescent layer between the electrodes to which an electric field is applied.

Such a hole injection transport compound is required to be a compound having a high efficiency for injecting a hole from the conductive layer 2a and being capable of efficiently transporting the injected hole. For this purpose, it is required to be a compound having a small ionization potential, a large hole mobility and a stability, whereby impurities likely to form traps, are hardly formed during the preparation or use.

Such a hole injection transport compound includes, for example, those disclosed on pages 5 and 6 in Japanese Unexamined Patent Publication No. 194393/1984 and in columns 13 and 14 in U.S. Pat. No. 4,175,960. Preferred specific examples of such a compound include aromatic amine compounds such as N,N'-diphenyl-N,N'-(3-methylphenyl)-1,1'-biphenyl-4,4'-diamine, 1,1'-bis(4-di-p-tolylaminophenyl)cyclohexane, and 4,4'-bis(diphenylamino)quadrophenyl.

The hole injection transport layer 3 is formed on the above mentioned conductive layer 2a by a coating method or by a vacuum deposition method.

In the case of coating, a coating solution is prepared by adding and dissolving one or more hole injection transport compounds and, if necessary, a binder resin which will not trap a hole and an additive such as a coating property-improving agent such as a leveling agent, and the coating solution is applied on the conductive layer 2a by a method such as a spin coating method, followed by drying to form the hole injection transport layer 3. As the binder resin, a polycarbonate, a polyarylate or a polyester may, for example, be mentioned. If the amount of the binder resin is large, the hole mobility tends to decrease. Therefore the smaller the amount of the binder resin, the better. The amount is preferably at most 50% by weight.

The thickness of the hole injection transport layer is usually from 100 to 3,000 Å, preferably from 300 to 1,000 Å. A vacuum deposition method is commonly employed to uniformly form such a thin film.

Referring to FIG. 1, the organic luminescent layer 4 is usually deposited on the hole injection transfer layer 3. This layer plays a role of transporting an electron from the conductive layer 2b towards the hole injection transport layer 3 and a role of emitting light upon the recombination of the hole and the electron, simultaneously. As a conventional organic luminescent compound satisfying such a condition, an aromatic compound such as tetraphenylbutadiene or coumarin (Japanese Unexamined Patent Publication No. 51781/1982) or a metal complex such as an aluminum complex of 8-hydroxyquinoline (Japanese Unexamined Patent Publication No. 194393/1984) may be mentioned.

Referring to FIG. 2, an electron injection transport layer 5 is provided between the organic luminescent layer 4 and the conductive layer 2b as a means of improving the efficiency of the light emission. The electron injection transport layer 5 is believed to play a role of efficiently injecting an electron from the conductive layer 2b and simultaneously play a role of transporting the injected electron to the luminescent layer 4. With this structure, the compound used for the luminescent layer 4 is not required to have an electron transporting ability. Accordingly, degree of freedom in the choice of the material can thereby be increased.

The electroluminescent device of the present invention is characterized in that the organic luminescent layer contains, as the above organic luminescent compound, a compound selected from the group consisting of a compound of the above formula (I), a compound of the above formula (II) and a compound having at least one group selected from the group consisting of aromatic hydrocarbon cyclic groups and aromatic heterocyclic groups, bonded directly, or via other group, to a naphthyridine skeleton as identified above.

In the above formula (I), each of Ⓐ and Ⓑ is an aromatic hydrocarbon group which may have a substituent, and is selected from e.g. a phenyl group, a naphthyl group, and a phenanthryl group. The substituent includes, for example, a halogen atom such as a chlorine atom, a bromine atom or an iodine atom; a $C_1$–$C_6$ alkyl group such as a methyl group or an ethyl group; a $C_1$–$C_6$ alkoxy group such as a methoxy group or an ethoxy group; an alkoxycarbonyl group containing a $C_1$–$C_6$ alkoxy group, such as a methoxycarbonyl group or an ethoxycarbonyl group; a $C_1$–$C_6$ alkoxysulfonyl group such as a methoxysulfonyl group or an ethoxysulfonyl group; a cyano group, an amino group, a dimethylamino group, and a nitro group.

Ⓒ is a nitrogen atom which may have a substituent, a sulfur atom, an oxygen atom, or a selenium atom. The substituent bonded to the nitrogen atom may be a hydrogen atom, a substituted or unsubstituted alkyl group, for example, an alkyl group such as a $C_1$–$C_{28}$ alkyl group; an alkoxyalkyl group such as a methoxyethyl group or an ethoxyethyl group; an alkoxyalkoxyalkyl group such as a methoxyethoxyethyl group or n-butoxyethoxyethyl group; an alkoxyalkoxyalkyl group such as a methoxyethoxyethyl group or an ethoxyethoxyethyl group; an aryloxyalkyl group which may be substituted, such as a phenyloxyethyl group, a naphthyloxyethyl group or a p-chlorophenyloxyethyl group; an arylalkyl group which may be substituted, such as a benzyl group, a phenethyl group, a p-chlorobenzyl group or a p-nitrobenzyl group; a cycloalkylalkyl group such as a cyclohexylmethyl group, a cyclohexylethyl group or a cyclopentylethyl group; an alkenyloxyalkyl group which may be substituted, such as an allyloxyethyl group or a 3-bromoallyloxyethyl group; a cyanoalkyl group such as a cyanoethyl group or a cyanomethyl group; a hydroxyalkyl group such as a hydroxyethyl group or a hydroxymethyl group; and a tetrahydrofurylalkyl group such as a tetrahydrofuryl group or a tetrahydroethyl group, a substituted or unsubstituted alkenyl group such as a 2-chloroallyl group, a substituted or unsubstituted aryl group such as a phenyl group, a p-methylphenyl group, a naphthyl group or a m-methoxyphenyl group, or a cycloalkyl group such as a cyclohexyl group or a cyclopentyl group.

D̄ is a nitrogen atom or a carbon atom which may have a substituent. The substituent includes, for example, a hydrogen atom, a cyano group, an amide group of the formula:

-CONH₂, -CONHR OR -CONRR'

(wherein each of R and R' is an aromatic hydrocarbon group such as a phenyl group, or an alkyl group which may be substituted), an ester group of the formula:

-COOR (wherein R is an aromatic hydrocarbon group such as a phenyl group, or an alkyl group which may be substituted), a $C_1$–$C_{28}$ alkyl group, a carboxyl group, an aromatic hydrocarbon group such as a phenyl, naphthyl or phenanthryl group, which may be substituted; an aromatic heterocyclic group such as a thienyl, pyrrolyl, thiazolyl, furyl, oxazolyl, benzothienyl, benzofuranyl, indoyl or pyridyl group, which may be substituted.

Preferred specific examples of the compound of the formula (I) include compounds of the following formulas (1) to (15).

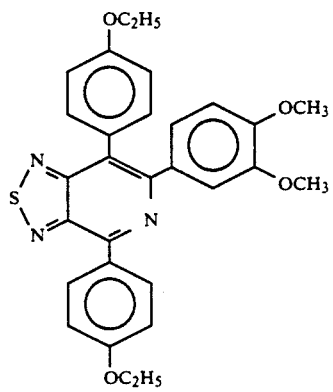
(1)

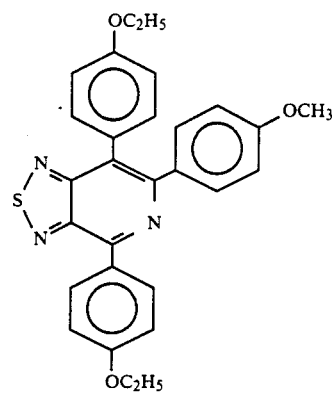
(2)

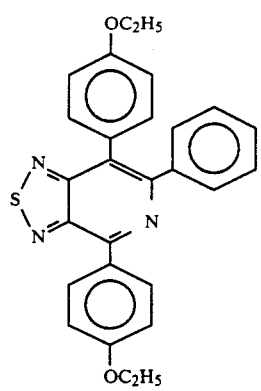
(3)

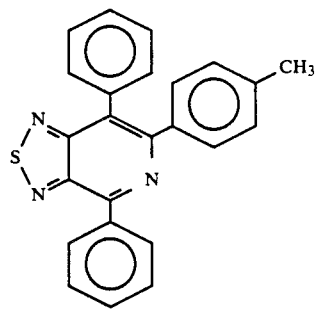
(4)

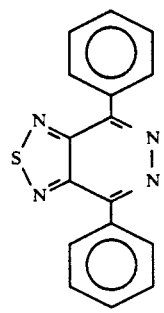
(5)

(6) 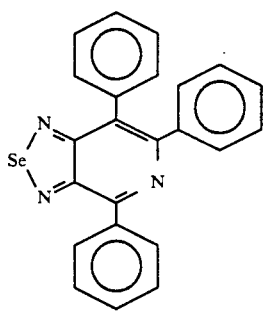

(7) 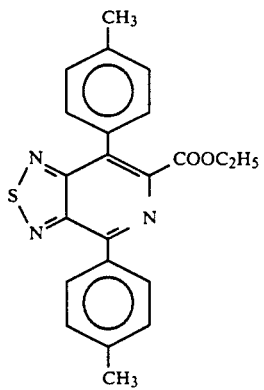

(8) 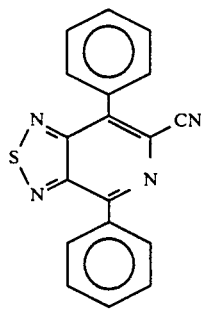

(9) 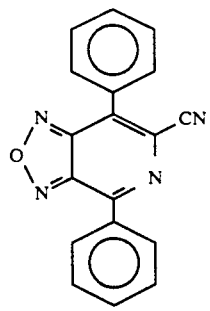

(10) 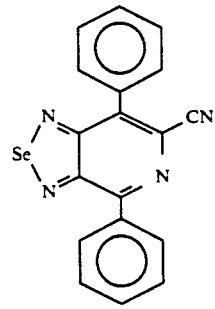

(11) 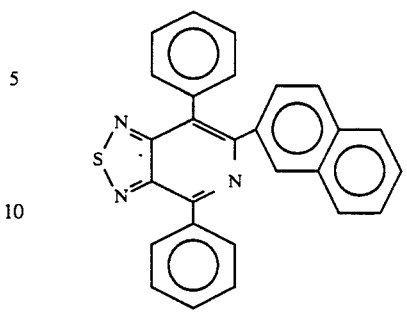

(12) 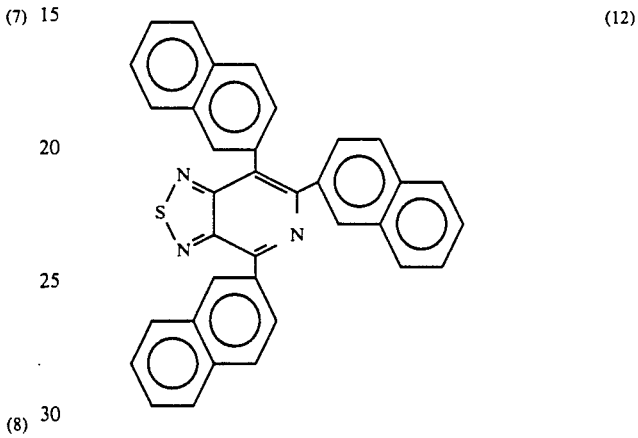

The compounds of the formulas (13) to (15) have resonance structures, and the NH group in the 5-membered ring may be located at either one of the remaining two nitrogen atom. Each of these compounds exhibits strong fluorescence and is useful as a compound for the organic luminescent layer. Particularly preferred are the compounds of the formulas (1), (2) and (3).

Referring to the above formula (II), each of Ⓔ, Ⓕ, Ⓖ and Ⓗ is an aromatic hydrocarbon group such as a phenyl, naphthyl or phenanthryl group, which may have a substituent. The substituent includes, for example, a halogen atom such as a chlorine atom, a bromine atom or an iodine atom; a $C_1-C_6$ alkyl group such as a methyl group or an ethyl group; a $C_1-C_6$ alkoxy group such as a methoxy group or an ethoxy group; an alkoxycarbonyl group containing a $C_1-C_6$ alkoxy group, such as a methoxycarbonyl group or an ethoxycarbonyl group; an alkoxysulfonyl group such as a methoxysulfonyl group or an ethoxysulfonyl group; a cyano group, an amino group, a dimethylamino group, and a nitro group.

Ⓘ is a nitrogen atom which may have a substituent, a sulfur atom, an oxygen atom or a selenium atom. The substituent bonded to the nitrogen atom includes, for example, a substituted or unsubstituted alkyl group, for example, an alkyl group such as a $C_1-C_{28}$ alkyl group; an alkoxyalkyl group such as a methoxyethyl group or an ethoxyethyl group; an alkoxyalkoxyalkyl group such as a methoxyethoxyethyl group or a n-butoxyethoxyethyl group; an alkoxyalkoxyalkoxyalkyl group such as a methoxyethoxyethoxyethyl group or an ethoxyethoxyethoxyethyl group; an aryloxyalkyl group which may be substituted, such as a phenyloxyethyl group, a naphthyloxyethyl group or a p-chlorophenyloxyethyl group; an arylalkyl group which may be substituted, such as a benzyl group, a phenethyl group, a p-chlorobenzyl group or a p-nitrobenzyl group; a cycloalkylalkyl group such as a cyclohexylmethyl group, a cyclohexylethyl group or a cyclopentylethyl group; an alkenyloxyalkyl group which may be substituted, such as an allyloxyethyl group or a 3-bromoallyloxyethyl group; a cyanoalkyl group such as a cyanoethyl group or a cyanomethyl group; a hydroxyalkyl group such as a hydroxyethyl group or a hydroxymethyl group; or a tetrahydrofurylalkyl group such as a tetrahydrofuryl group or a tetrahydrofurylethyl group, a substituted or unsubstituted alkenyl group such as an allyl group or a 2-chloroallyl group, a substituted or unsubstituted aryl group such as a phenyl group, a p-methylphenyl group, a naphthyl group or a m-methoxyphenyl group, and a cycloalkyl group such as a cyclohexyl group or a cyclopentyl group.

Ⓙ is a hydrogen atom, a cyano group, an amide group of the formula:

-CONH$_2$, -CONHR or -CONRR'

(wherein each of R and R' is an aromatic hydrocarbon group such as a phenyl group, or an alkyl group which may be substituted), an ester group of the formula:

-COOR (wherein R is an aromatic hydrocarbon such as a phenyl group, or an alkyl group which may be substituted), a $C_1$-$C_{28}$ alkyl group, a carboxyl group, an aromatic hydrocarbon group such as a phenyl, naphthyl or phenanthryl group, which may be substituted, or an aromatic heterocyclic group such as a thienyl, pyrrolyl, thiazolyl, furyl, oxazolyl, benzothienyl, benzofuranyl, indolyl or pyridyl group, which may be substituted.

Preferred specific examples of the compound of the formula (II) include compounds of the following formulas (16) to (33):

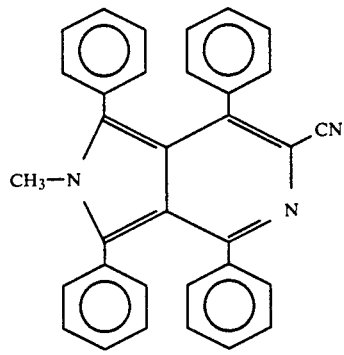
(16)

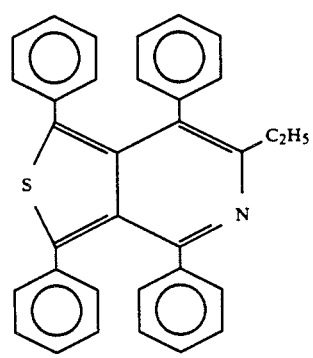
(17)

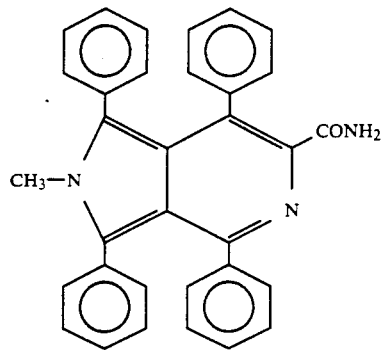
(18)

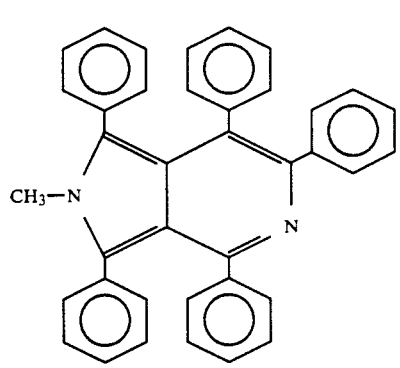
(19)

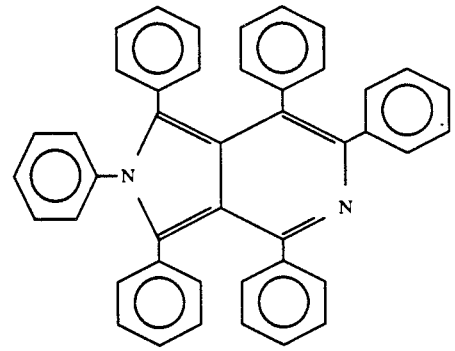
(20)

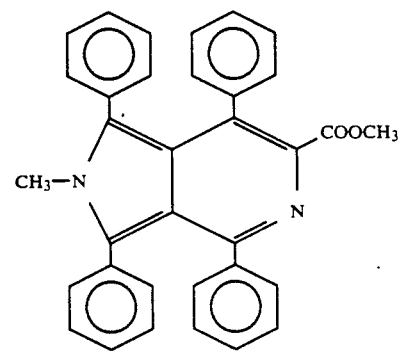
(21)

-continued
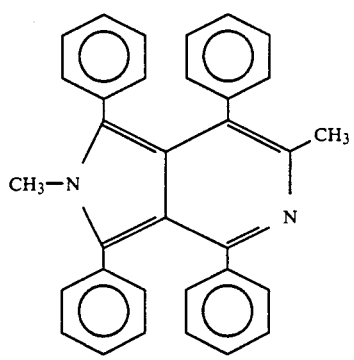
(22)
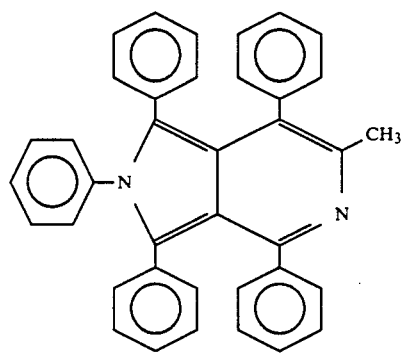
(23)
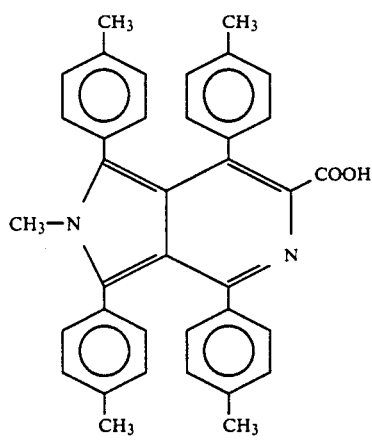
(24)
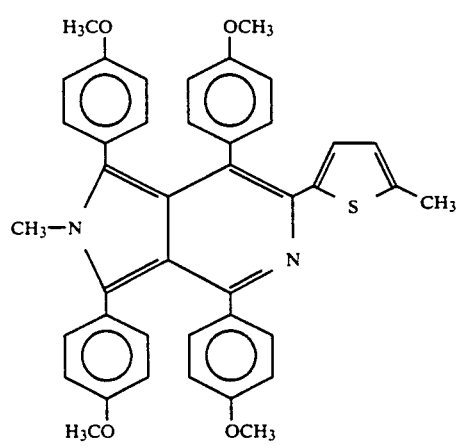
(25)
-continued
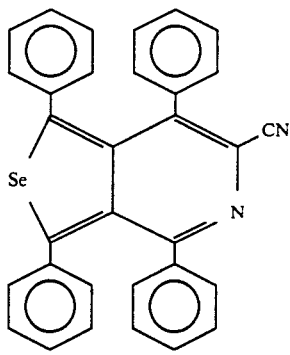
(26)
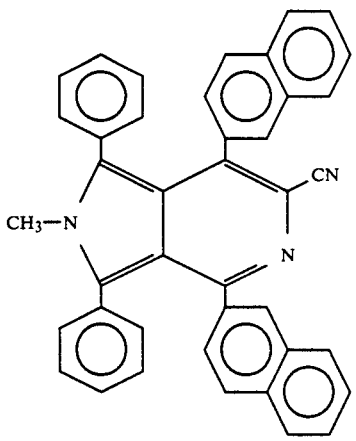
(27)
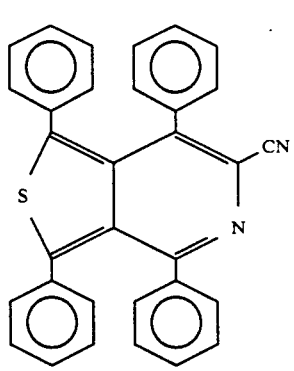
(28)
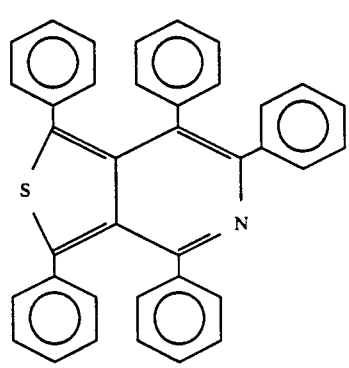
(29)

-continued

(30)
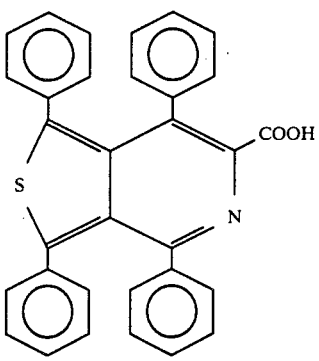

(31)
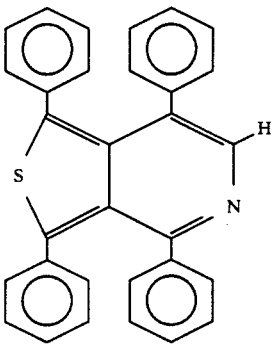

(32)
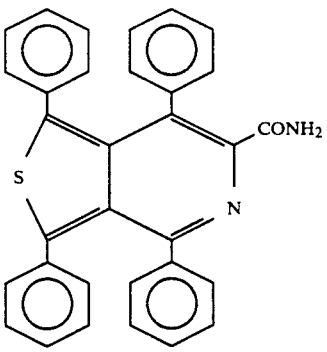

(33)
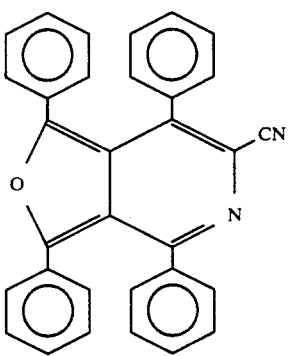

Each of these compounds exhibits strong fluorescence and is useful as a compound for the organic luminescent layer. The compounds of the formulas (16) and (18) are particularly preferred.

Now, the compound having at least one group selected from the group consisting of aromatic hydrocarbon cyclic groups and aromatic heterocyclic groups, bonded directly, or via other group, to the naphthyridine skeleton, will be described in further detail. Such a compound may be represented by the following formula (III) or (IV):

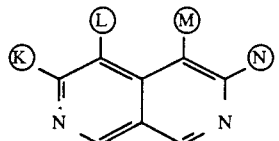  (III)

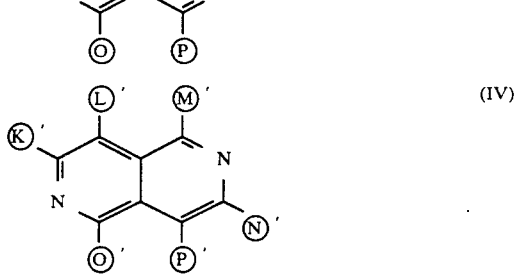  (IV)

wherein at least one of $K$, $L$, $M$, $N$, $O$ and $P$, or at least one of $K'$, $L'$, $M'$, $N'$, $O'$ and $P'$ is a group having an aromatic hydrocarbon cyclic group or an aromatic heterocyclic group directly or via other group.

Specifically, in a case where any one of $K$ to $P$ or $K'$ to $P'$ is a group having an aromatic group directly, at least one of $K$, $L$, $M$, $N$, $O$ and $P$, or at least one of $K'$, $L'$, $M'$, $N'$, $O'$ and $P'$, is an aromatic hydrocarbon cyclic group such as a phenyl, acenaphthyl, anthryl or phenanthryl group, which may have a substituent, or an aromatic heterocyclic group such as a thienyl, pyrrolyl, thiazolyl, carbazolyl, oxazolyl, benzothienyl, benzofuryl, benzooxazolyl, indolyl, pyridyl or quinolyl group, which may have a substituent.

The substituents for such groups include, for example, a halogen atom such as a chlorine atom, a bromine atom or an iodine atom; a $C_1$-$C_6$ alkyl group such as a methyl group or an ethyl group; a $C_1$-$C_6$ alkoxyl group such as a methoxy group or an ethoxy group; an alkoxycarbonyl group containing a $C_1$-$C_6$ alkoxy group, such as a methoxycarbonyl group or an ethoxycarbonyl group; an alkoxysulfonyl group containing a $C_1$-$C_6$ alkoxy group, such as a methoxysulfonyl group or an ethoxysulfonyl group; a cyano group, an amino group, a dimethylamino group, and a nitro group.

Further, in the case where any one of $K$ to $P$ or $K'$ to $P'$ is a group having an aromatic group via other group, at least one of $K$, $L$, $M$, $N$, $O$ and $P$, or at least one of $K'$, $L'$, $M'$, $N'$, $O'$ and $P'$, may be -CONH$_2$, -CONRR' or -COOR (wherein R is an aromatic hydrocarbon cyclic group such as a phenyl or naphthyl group which may be substituted, and R' is such an aromatic hydrocarbon cyclic group or an alkyl group which may be substituted), or a group having at least one aromatic hydrocarbon cyclic or aromatic heterocyclic group therein, such as a benzoyl group. As such an aromatic hydrocarbon cyclic group or aromatic heterocyclic group, a substituted or unsubstituted phenyl group is preferred. Further, in a case where $L$ and $M$, $O$ and $P$, $L'$ and $M'$, or $O'$ and $P'$, are simultaneously aromatic hydrocarbon cyclic groups or aromatic heterocyclic groups, it is preferred that the two groups are not simultaneously bulky groups.

In the compound of the above formula (III) or (IV) used in the present invention, specific examples of groups other than the above-mentioned aromatic hydrocarbon cyclic groups and aromatic heterocyclic groups, for Ⓚ, Ⓛ, Ⓜ, Ⓝ, Ⓞ and Ⓟ, or for Ⓚ', Ⓛ', Ⓜ', Ⓝ', Ⓞ' and Ⓟ', include, for example, -CONH₂, -CONHR", -CONHR"R"' and -COOR" (wherein each of R" and R"' is an alkyl group which may be substituted), a nitro group, a cyano group, a halogen atom such as a chlorine atom, a bromine atom or an iodine atom, a $C_1$-$C_{28}$ alkyl group, an alkenyl group such as a vinyl group or an allyl group, a carboxyl group and an acetyl group.

In the formulas (III) and (IV), there may be the maximum of 6 aromatic groups at the locations of Ⓚ to Ⓟ or Ⓚ' to Ⓟ'. However, the compounds to be used in the present invention are preferably those having aromatic substituents at least at four positions of Ⓚ, Ⓛ, Ⓜ, Ⓞ or Ⓚ', Ⓛ', Ⓜ' and Ⓞ'.

Preferred specific examples of the compound having such a naphthyridine skeleton, include compounds having the following formulas (34) to (51):

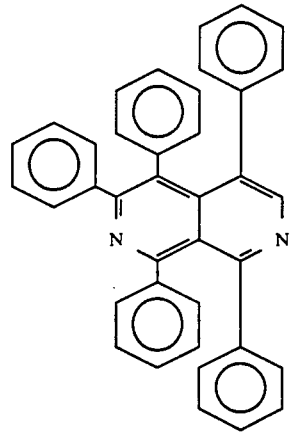

(34)

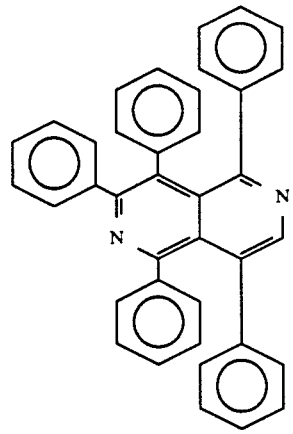

(35)

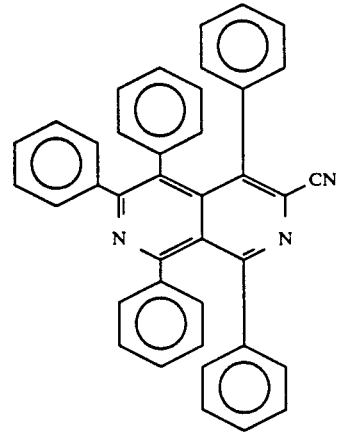

(36)

-continued
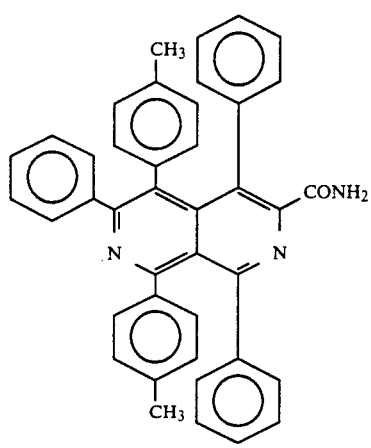
(37)
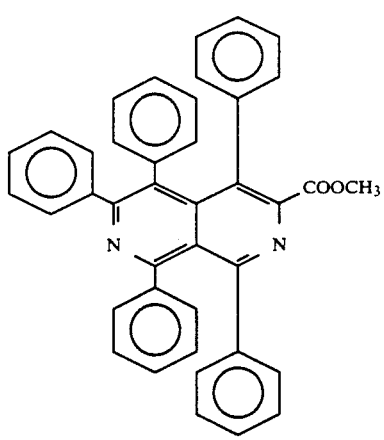
(38)
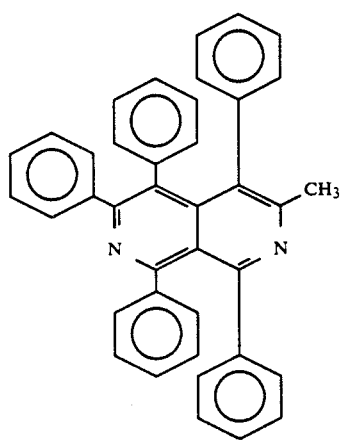
(39)

-continued
(40)
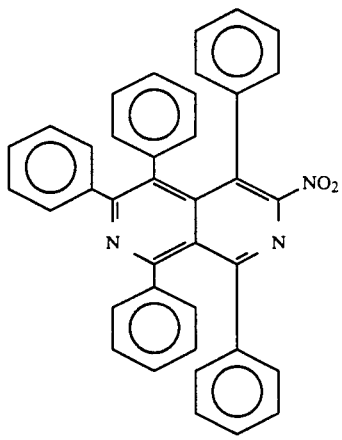
(41)
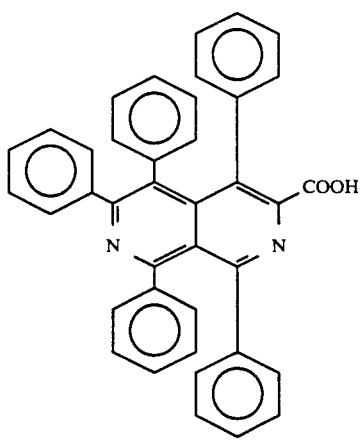
(42)
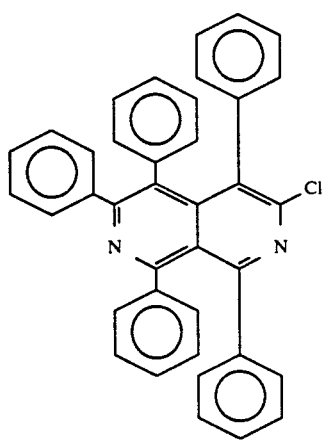

-continued
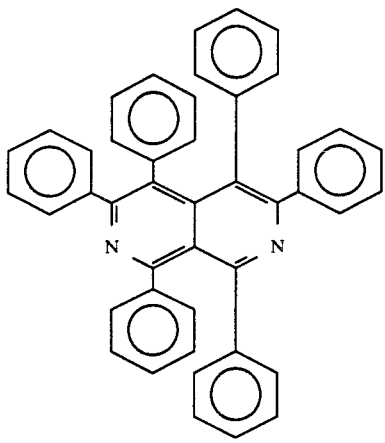
(43)
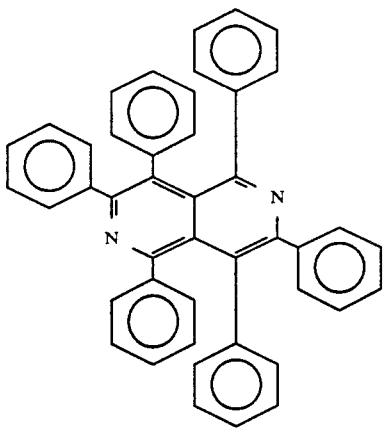
(44)
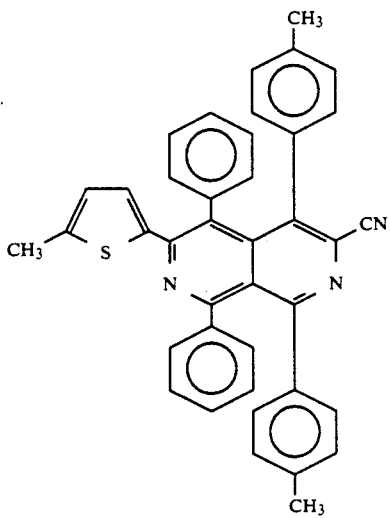
(45)

(46)
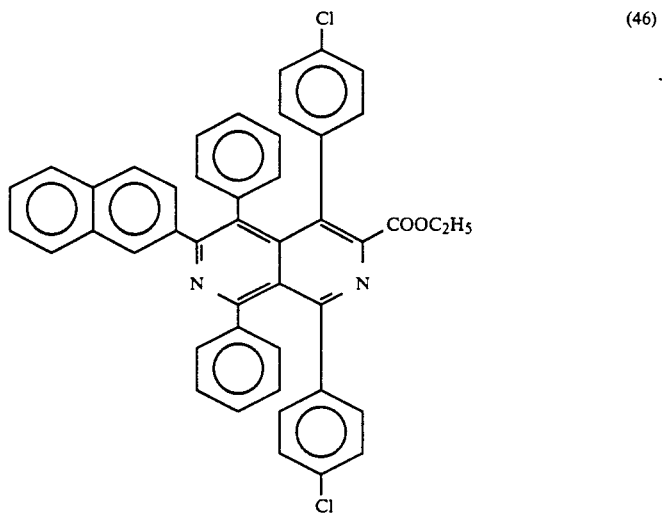
(47)
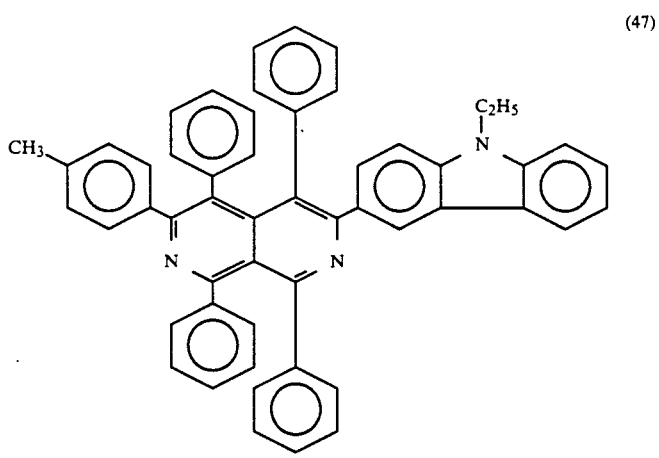
(48)
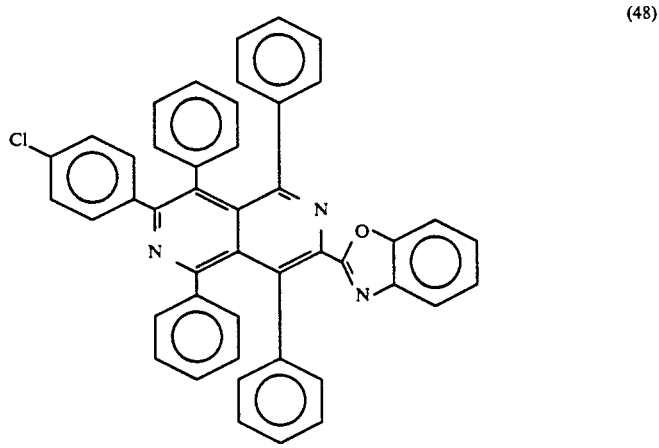

(49)

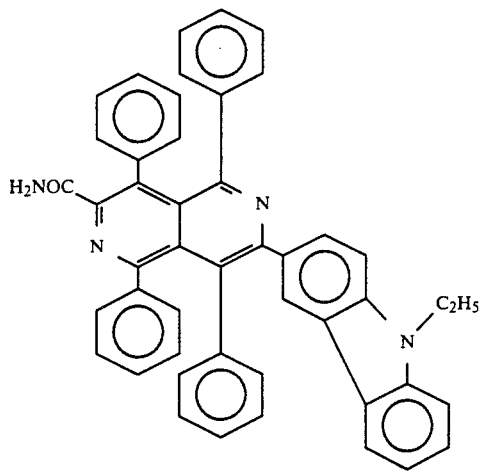

(50)

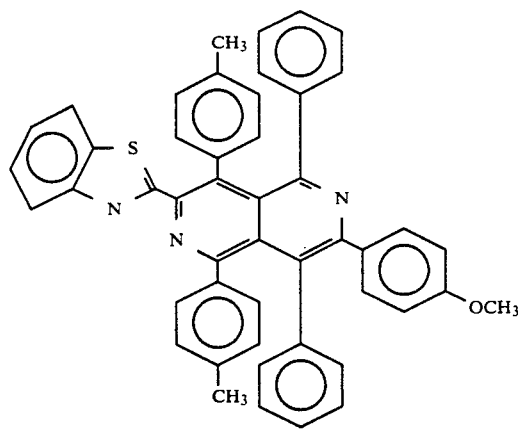

(51)

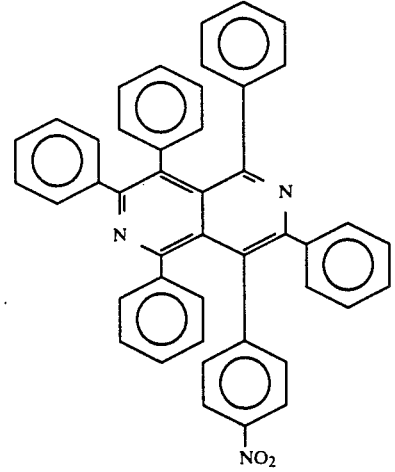

Each of these compounds exhibits strong fluorescence and is useful as a compound for the organic luminescent layer. However, the compounds of the formulas (34) and (44) are particularly preferred.

The methods for the preparation of the compounds of the above formula (I), the compounds of the above formula (II) and the above naphthyridine compounds, are disclosed by Mataga et al. in J. Heterocyclic. Chem., Vol. 18, p. 1073 (1981); ditto, Vol. 26, p. 215 (1989); and ditto, Vol. 20, p. 971 (1983).

The thickness of the organic luminescent layer 4 is usually from 100 to 2,000 Å, preferably from 300 to 1,000 Å.

The organic luminescent layer 4 may also be formed by the same method as used for the formation of the hole injection transfer layer. However, a vacuum deposition method is usually employed. It is frequently observed that an organic thin film formed by vacuum deposition undergoes aggregation and deterioration when left to stand for a long period of time. However, the organic luminescent compound of the present invention is excellent also in this respect.

The film thickness of the electron injection transport layer 5 formed on the organic luminescent layer is usually from 30 to 1,000 Å, preferably from 50 to 300 Å. As the compound to be used for the electron injection transport layer 5, the above-mentioned tetraphenylbutadiene or an aluminum complex of 8-hydroxyquinoline, may be mentioned.

Further, for the electroluminescent device of the present invention, a structure opposite to the one shown in FIG. 1 may be adopted. Namely, it is possible to deposit a conductive layer 2b, an organic luminescent layer 4, a hole injection transport layer 3 and a conductive layer 2a on the substrate in this order. As described above, it is also possible to provide the electroluminescent device of the present invention between two substrates, at least one of which has high transparency. Likewise, it is also possible to take a structure opposite to the one shown in FIG. 2, i.e. it is possible to deposit a conductive layer 2d, an electron injection transport layer 5, an organic fluorescent layer 4, a hole injection transport layer 3 and a conductive layer 2a on the substrate in this order.

According to the electroluminescent device of the present invention, the conductive layer (anode)/the hole injection transport layer/the luminescent layer/the conductive layer (cathode), or the conductive layer (anode)/the hole injection transport layer/the luminescent layer/the electron injection transport layer/the conductive layer (cathode), are sequentially provided on the substrate, and yet a certain specific compound is employed for the luminescent layer, whereby light emission having a practically sufficient luminance is obtainable at a low driving voltage, when a voltage is applied using the two conductive layers as electrodes. Accordingly, the electroluminescent device of the present invention is expected to be useful in the field of flat panel displays (such as wall-hanging type televisions), or as a light source utilizing the characteristics as the surface light emitting element (such as a light source for a coping machine, or a light source for the back light of liquid crystal display devices or meters), a display board or a signal lamp. Thus, its technical value is significant.

Now, the present invention will be described in further details with reference to Examples. However, it should be understood that the present invention is by no means restricted to such specific Examples.

EXAMPLE 1

An electroluminescent device having the structure as shown in FIG. 1, was prepared. A transparent conductive film of indium-tin oxide (ITO) formed on a glass substrate in a thickness of 1,000 Å, was subjected to ultrasonic cleaning with toluene and isopropyl alcohol, and then an aromatic amine compound of the following formula (52) was deposited thereon in a film thickness of 500 Å as a hole injection transfer layer by vacuum deposition.

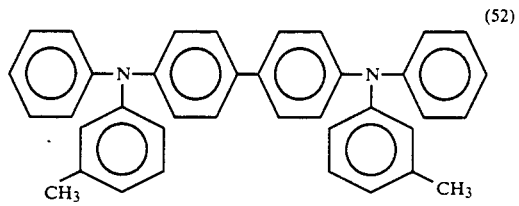

The pressure during the vacuum deposition was $6 \times 10^{-6}$ Torr.

Then, as an organic luminescent layer, a compound of the formula (1) was vacuum-deposited in a film thickness of 500 Å in the same manner as the hole injection transport layer.

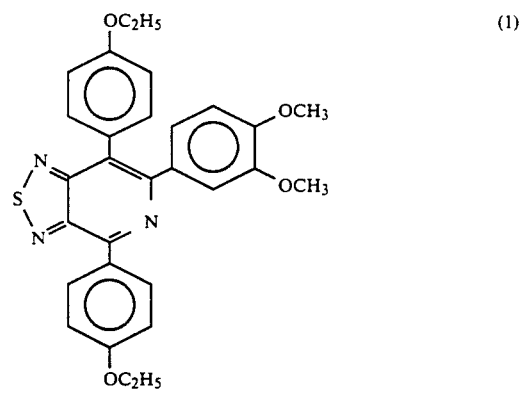

Finally, as a cathode, a magnesium-silver alloy electrode was vacuum-deposited in a film thickness of 1,500 Å at a film thickness ratio of 10:1 by simultaneous vacuum deposition. The pressure during the vacuum deposition was $6 \times 10^{-6}$ Torr, and a glossy electrode was thereby obtained.

With respect to the organic electroluminescent device having the structure as shown in FIG. 1, luminescent characteristics were evaluated by applying a direct current positive voltage to the ITO electrode (anode) and negative voltage to the magnesium-silver electrode (cathode), and the results are shown in Table 1. Here, the threshold voltage indicates a voltage at which the luminance becomes 1 cd/m².

EXAMPLE 2

An organic electroluminescent device was prepared in the same manner as in Example 1 except that a compound of the following formula (2) was used for the organic luminescent layer. The results of the evaluation of the luminescent characteristics are shown in Table 1.

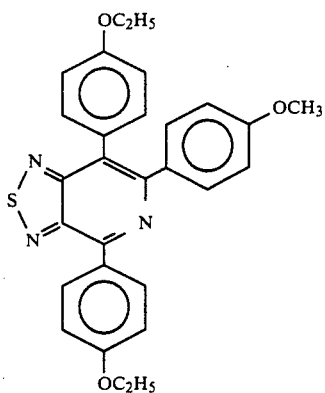

(2)

EXAMPLE 3

An organic electroluminescent device was prepared in the same manner as in Example 1 except that a compound of the following formula (3) was used for the organic fluorescent layer. The results of the evaluation of the luminescent characteristics are shown in Table 1.

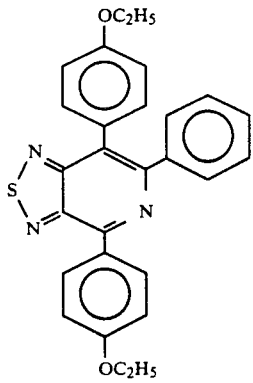

(3)

TABLE 1

|  | Example 1 | Example 2 | Example 3 |
|---|---|---|---|
| Comound | (1) | (2) | (3) |
| Maximum luminance (cd/m$^2$) | 1200 | 1600 | 1000 |
| Driving voltage (V) | 15 | 16 | 14 |
| Current density (mA/cm$^2$) | 100 | 100 | 100 |
| Wavelength of emitted light (nm) | 600 | 600 | 595 |
| Luminous efficiency (lm/W) | 0.25 | 0.31 | 0.22 |
| Threshold voltage (V) | 4 | 9 | 5 |

With each organic electroluminescent device, uniform light emission with a high luminance was obtained at a low voltage.

EXAMPLE 4

An electroluminescent device having the structure as shown in FIG. 1, was prepared. A transparent conductive film of indium-tin oxide (ITO) formed on a glass substrate in a thickness of 1,000 Å, was subjected to ultrasonic cleaning with toluene and isopropyl alcohol, and then the surface cleaning was conducted by exposing it to an argon glow discharge in a vacuum container for 1 minute. An aromatic amine compound of the above formula (52) was deposited thereon by vacuum deposition in a film thickness of 750 Å as a hole injection transport layer.

The vacuum deposition was conducted by placing the above aromatic amine compound in a ceramic crucible and heating around the crucible with a Ta wire heater to evaporate the evaporation source in the vacuum chamber. The pressure during the vacuum deposition was $1 \times 10^{-6}$ Torr.

Then, as an organic luminescent layer, a compound of the following formula (16) was vacuum-deposited in a film thickness of 776 Å in the same manner as the hole injection transport layer.

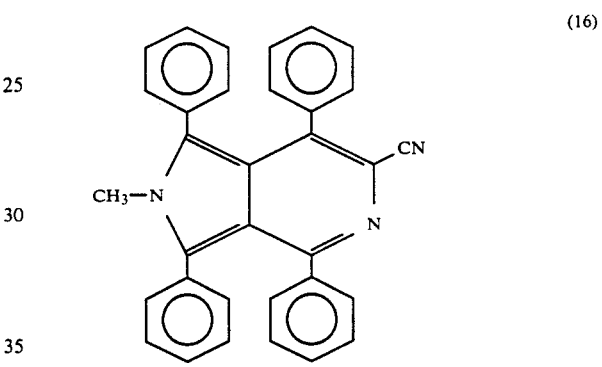

(16)

Finally, as a cathode, a magnesium-silver alloy electrode was vacuum-deposited in a film thickness of 2,000 Å at a film thickness ratio of 10:1 by simultaneous vacuum deposition. The vacuum deposition was conducted under a pressure of $1 \times 10^{-5}$ Torr using a molybdenum boat, and a glossy electrode was obtained.

Thus, an electroluminescent device having the structure as shown in FIG. 1 was prepared, and a direct current voltage of 25V was applied to the ITO electrode (anode) as positive and to the magnesium-silver electrode (cathode) as negative, whereby uniform light emission with a luminance of 15 cd/m$^2$ was obtained. This light emission was green with a peak wavelength of 525 nm. Further, the current density at that time was $1.2 \times 10^{-2}$ A/cm$^2$, and the luminous efficiency was 0.016 lm/W. The threshold voltage of the light emission was 20.1V.

EXAMPLE 5

In the same manner as in Example 4, a hole injection transport layer of 750 Å and an organic luminescent layer of 505 Å were vacuum-deposited, and then an aluminum complex of 8-hydroxyquinoline of the following formula (53) was vacuum-deposited in a thickness of 100 Å. Finally, a cathode electrode was formed to obtain an organic electroluminescent device having the structure as shown in FIG. 2.

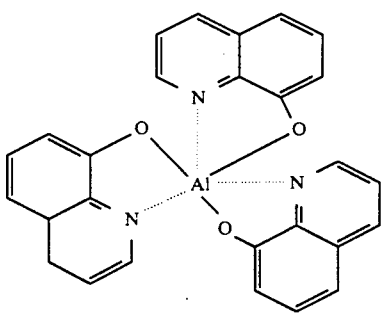

(53)

The characteristics of this device were evaluated in the same manner as in Example 1. Uniform light emission with a luminance of 1,128 cd/m$^2$ was obtained upon application of a direct current voltage of 24V. The light emission at that time was green with a peak wavelength of 525 nm. The profile of the peak agreed to the light emission spectrum of the vacuum deposited film of the compound used for the organic luminescent layer. The current density at that time was 0.17 A/cm$^2$, and the luminous efficiency was 0.09 lm/W. The threshold voltage of the light emission was 14.0V.

EXAMPLES 6 AND 7

Organic electroluminescent devices having the structures as shown in FIGS. 1 and 2 were prepared in the same manners as in Examples 1 and 2 except that a compound of the following formula (18) was used as the material for the respective organic luminescent layers. The film thicknesses of the respective luminescent layers were 650 Å and 500 Å.

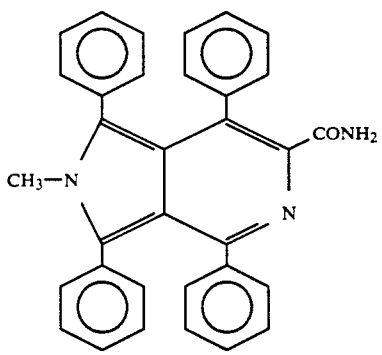

(18)

With each device, uniform light emission was obtained. The characteristics of each device are shown in Table 2.

TABLE 2

|  | Example 6 | Example 7 |
|---|---|---|
| Structure of the device | FIG. 1 | FIG. 2 |
| Maximum luminance (cd/m$^2$) | 274 | 333 |
| Driving voltage (V) | 37 | 29 |
| Current density (mA/cm$^2$) | 6.2 × 10$^{-2}$ | 4.5 × 10$^{-2}$ |
| Wavelength of emitted light (nm) | 505 | 505 |
| Luminous efficiency | 0.04 | 0.08 |

TABLE 2-continued

|  | Example 6 | Example 7 |
|---|---|---|
| (lm/W) Threshold voltage (V) | 24 | 17 |

EXAMPLE 8

An electroluminescent device having the structure as shown in FIG. 1, was prepared. A transparent conductive film of indium-tin oxide (ITO) formed on a glass substrate in a thickness of 1,200 Å, was subjected to ultrasonic cleaning with toluene and isopropyl alcohol, and then the surface cleaning was conducted by exposing it to argon glow discharge in a vacuum container for 1 minute. Then, an aromatic amine compound of the above formula (52) was vacuum-deposited thereon in a thickness of 750 Å as a hole injection transport layer by vacuum deposition.

The vacuum deposition was conducted by putting the above aromatic amine compound into a ceramic crucible, heating around the crucible by a Ta wire heater to evaporate the evaporation source in the vacuum container. The pressure during the vacuum deposition was 1×10$^{-6}$ Torr.

Then, as an organic luminescent layer, a compound of the following formula (34) was vacuum-deposited in a film thickness of 500 Å in the same manner as in the case of the hole injection transport layer.

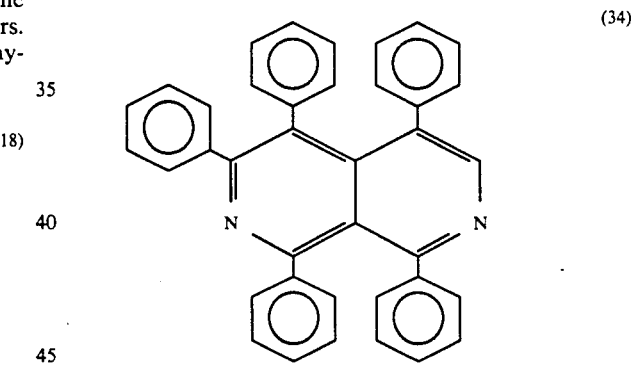

(34)

Further, as an electron transport layer, an aluminum complex of 8-hydroxyquinoline of the above formula (53) was vacuum-deposited in a thickness of 100 Å.

Finally, as a cathode, a magnesium-silver alloy electrode was vacuum-deposited in a film thickness of 2,000 Å at a film thickness ratio of 10:1 by simultaneous vacuum deposition. The vacuum deposition was conducted under a pressure of 1×10$^{-5}$ Torr by means of a molybdenum boat, and an electrode having gloss was obtained.

Thus, an electroluminescence device having the structure as shown in FIG. 2 was prepared. A direct current voltage of 30V was applied to the ITO electrode (anode) of this device as plus and to the magnesiumsilver electrode (cathode) as minus, whereby uniform light emission with a luminance of 156 cd/m$^2$ was observed. This light emission was yellow, and the peak wavelength was 570 nm. Further, the current density at this time was 57 mA/cm$^2$, and the luminous efficiency was 0.029 lm/W. The threshold voltage of the light emission (i.e. a voltage at which the luminance was 1 cd/m$^2$) was 16V.

EXAMPLE 9

On a glass ITO substrate cleaned in the same manner as in Example 8, an aromatic amine compound of the following formula (44) was vacuum-deposited in a thickness of 500 Å as a hole injection transport layer. Then, a compound of the following formula (44) was vacuum-deposited in a film thickness of 500 Å as an organic luminescent layer.

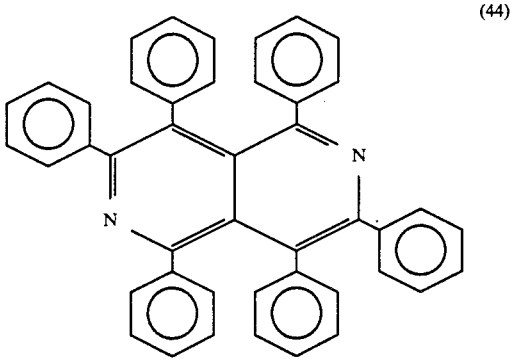

(44)

Further, as an electron transport layer, an aluminum complex of 8-hydroxyquinoline of the above formula (53) was vacuum-deposited in a thickness of 100 Å. Then, a cathode was vacuum-deposited in the same manner as in Example 1 to obtain an organic electroluminescent device having the structure as shown in FIG. 2.

In the same manner as in Example 8, a direct current voltage of 24V was applied, whereby uniform light emission with a luminance of 131 cd/m$^2$, was observed. This light emission was yellow, and the peak wavelength was 570 nm. Further, the current density at that time was 26 mA/cm$^2$, and the luminous efficiency was 0.06 lm/W. The threshold voltage of the light emission (i.e. the voltage at which the luminance becomes 1 cd/m$^2$) was 14V.

We claim:

1. An organic electroluminescent device having an organic hole injection transport layer and an organic luminescent layer formed between two conductive layers constituting electrodes, wherein the organic luminescent layer contains a compound selected from the group consisting of a compound of the following formula (I):

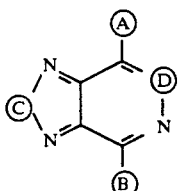

(I)

wherein each of Ⓐ and Ⓑ is an aromatic hydrocarbon group which may have a substituent, Ⓒ is a nitrogen atom which may have a substituent, a sulfur atom, an oxygen atom, or a selenium atom, and Ⓓ is a nitrogen atom, or a carbon atom which may have a substituent; a compound of the following formula (II):

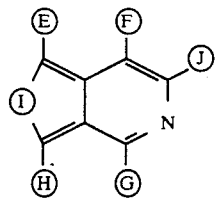

(II)

wherein each of Ⓔ, Ⓕ, Ⓖ and Ⓗ is an aromatic hydrocarbon group which may have a substituent, Ⓘ is a nitrogen atom which may have a substituent, a sulfur atom, an oxygen atom, or a selenium atom, and Ⓙ is a hydrogen atom, a cyano group, an amide group, an ester group, an alkyl group, a carboxyl group, an aromatic hydrocarbon group which may be substituted, or an aromatic heterocyclic group which may be substituted; and a compound having at least one group selected from the group consisting of aromatic hydrocarbon cyclic groups and aromatic heterocyclics groups, bonded directly, or via other group, to a naphthyridine skeleton of the following formula:

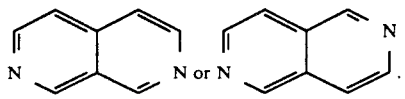

2. The elect device according to claim 1, wherein organic luminescent layer contains a compound of the formula (I) wherein each of Ⓐ and Ⓑ is a phenyl, naphthyl or phenanthryl group which may be substituted by a halogen atom, a $C_1$-$C_6$ alkyl group, a $C_1$-$C_6$ alkoxy group, an alkoxycarbonyl group containing a $C_1$-$C_6$ alkoxy group, a $C_1$-$C_6$ alkoxysulfonyl group, a cyano group, an amino group, a dimethylamino group, or a nitro group, Ⓒ is a sulfur atom, an oxygen atom, a selenium atom, or a nitrogen atom which may be substituted by a hydrogen atom, a substituted or unsubstituted alkyl group, a substituted or unsubstituted alkenyl group, a substituted or unsubstituted aryl group, or a cycloalkyl group, and Ⓓ is a nitrogen atom, or a carbon atom which may be substituted by a hydrogen atom, a cyano group, an amide group of the formula:

-CONH$_2$, -CONHR or -CONRR'

(wherein each of R and R' is an aromatic hydrocarbon group, or an alkyl group which may be substituted), an ester group of the formula:

-COOR (wherein R is an aromatic hydrocarbon group, or an alkyl group which may be substituted), a $C_1$-$C_{28}$ alkyl group, a carboxyl group, an aromatic hydrocarbon group which may be substituted, or an aromatic heterocyclic group which may be substituted.

3. The electroluminescent device according to claim 1, wherein the organic luminescent layer contains a compound of the formula (II) wherein each of Ⓔ, Ⓕ, Ⓖ and Ⓗ is a phenyl, naphthyl or phenanthryl group which may be substituted by a halogen atom, a $C_1$-$C_6$ alkyl group, a $C_1$-$C_6$ alkoxy group, an alkoxycarbonyl group containing a $C_1$-$C_6$ alkoxy group, an alkoxysulfonyl group, a cyano group, an amino group, a dimethylamino group or a nitro group, Ⓘ is a sulfur atom, an oxygen atom, a selenium atom, or a nitrogen atom which may be substituted by a substituted or unsubstituted alkyl group, a substituted or unsubstituted alkenyl group, a substituted or unsubstituted aryl group, or a cycloalkyl group, and Ⓙ is a hydrogen atom, a cyano group, an amide group of the formula:

-CONH$_2$, -CONHR or -CONRR'

(wherein each of R and R' is an aromatic hydrocarbon group, or an alkyl group which may be substituted), an ester group of the formula:

-COOR (wherein R is an aromatic hydrocarbon group, or an alkyl group which may be substituted), a C$_1$-C$_{28}$ alkyl group, a carboxyl group, an aromatic hydrocarbon group which may be substituted, or an aromatic heterocyclic group which may be substituted.

4. The electroluminescent device according to claim 1, wherein the organic luminescent layer contains a compound of the formula:

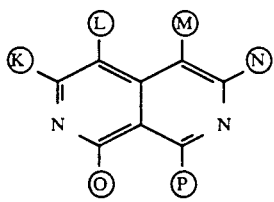
(III)

wherein at least one of Ⓚ, Ⓛ, Ⓜ, Ⓝ, Ⓞ and Ⓟ is a group having an aromatic hydrocarbon cyclic group or an aromatic heterocyclic group directly or via other group, or

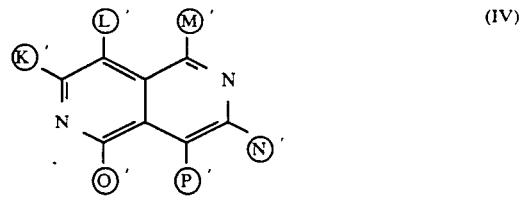
(IV)

wherein at least one of Ⓚ', Ⓛ', Ⓜ', Ⓝ', Ⓞ' and Ⓟ' is a group having an aromatic hydrocarbon cyclic group or an aromatic heterocyclic group directly or via other group.

5. The electroluminescent device according to claim 4, wherein at least one of Ⓚ, Ⓛ, Ⓜ, Ⓝ, Ⓞ and Ⓟ in the formula (III), or at least one of Ⓚ', Ⓛ', Ⓜ', Ⓝ', Ⓞ' and Ⓟ' in the formula (IV) is a phenyl, acenaphthyl, anthryl, phenanthryl, thienyl, pyrrolyl, thiazolyl, furyl, carbazolyl, oxazolyl, benzothienyl, benzofuryl, benzooxazolyl, indolyl, pyridyl or quinolyl group, which may be substituted by a halogen atom, a C$_1$-C$_6$ alkyl group, a C$_1$-C$_6$ alkoxy group, an alkoxycarbonyl group containing a C$_1$-C$_6$ alkoxy group, a C$_1$-C$_6$ alkoxysulfonyl group, a cyano group, an amino group, a dimethylamino group, or a nitro group.

6. The electroluminescent device according to claim 4, wherein at least one of Ⓚ, Ⓛ, Ⓜ, Ⓝ, Ⓞ and Ⓟ in the formula (III), or at least one of Ⓚ', Ⓛ', Ⓜ', Ⓝ', Ⓞ' and Ⓟ' in the formula (IV) is -CONH$_2$, -CONRR' or -COOR (wherein R is a phenyl or naphthyl group which may be substituted), and R' is a phenyl or naphthyl group which may be substituted or an alkyl group which may be substituted, or a benzyl group.

7. The electroluminescent device according to claim 1, wherein the organic luminescent layer contains a compound selected from the group consisting of compounds of the following formulas (1) to (51):

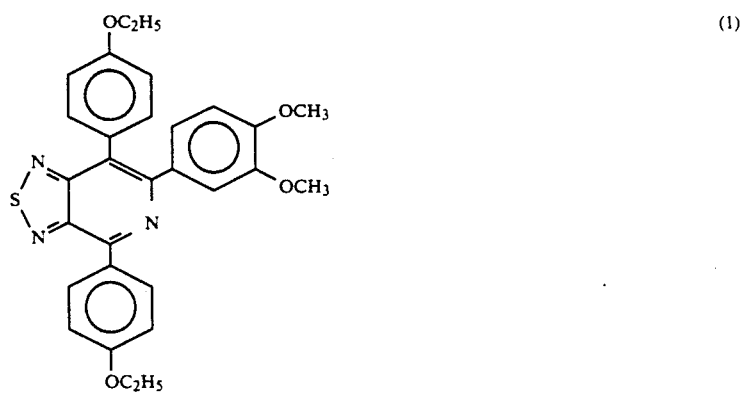
(1)

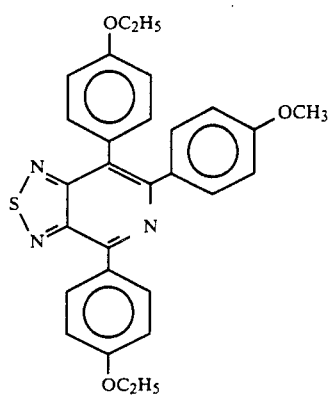 (2)
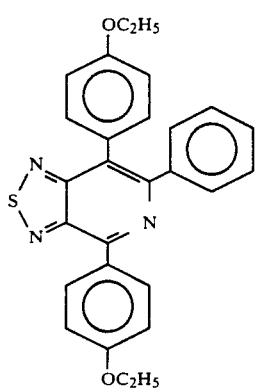 (3)
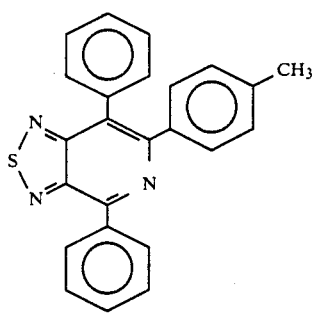 (4)
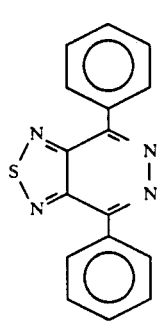 (5)

-continued
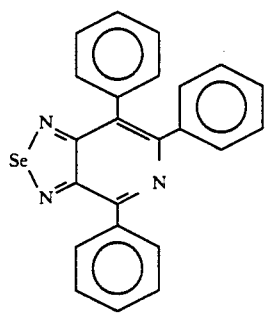
(6)
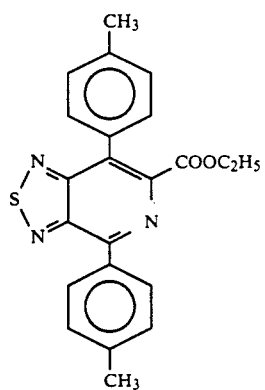
(7)
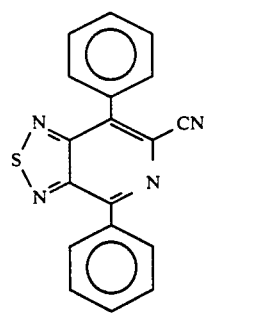
(8)
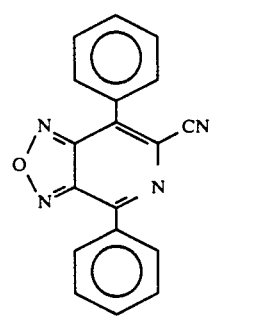
(9)
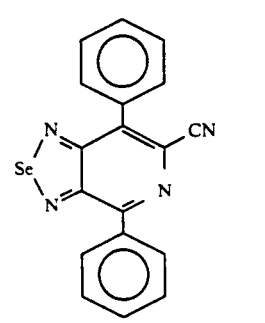
(10)

(11)
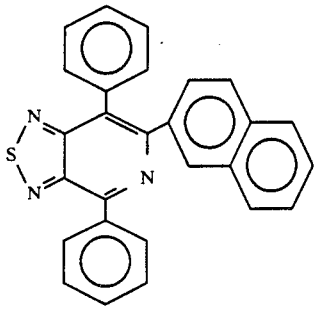
(12)
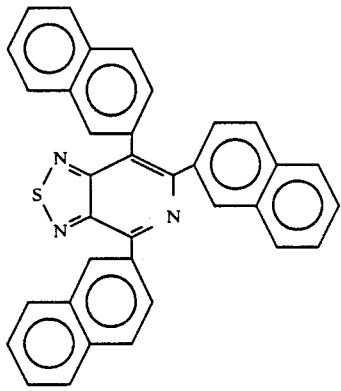
(13)
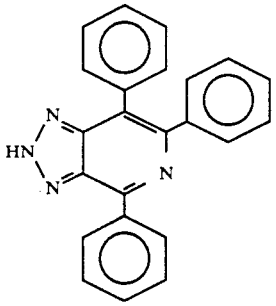
(14)
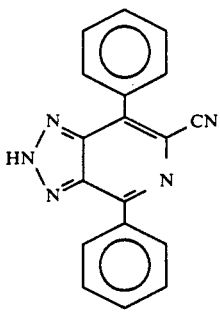
(15)
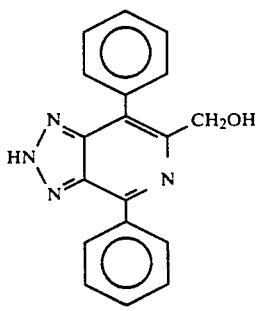

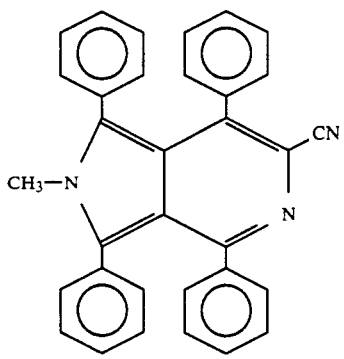
(16)
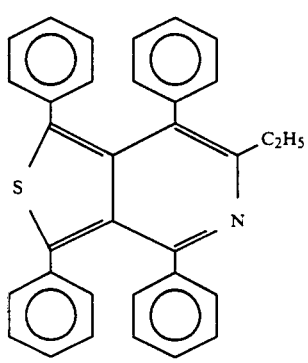
(17)
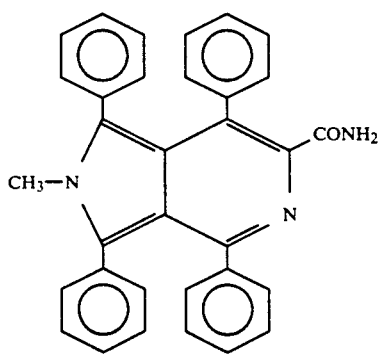
(18)
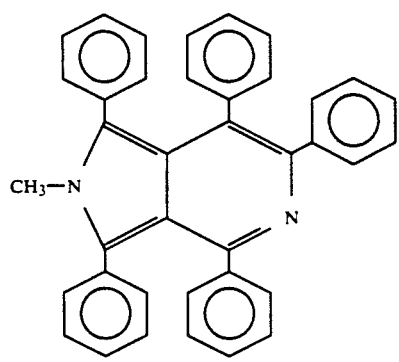
(19)

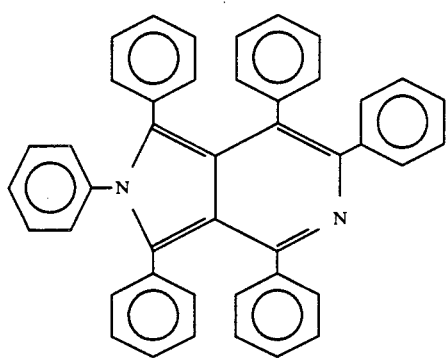
(20)
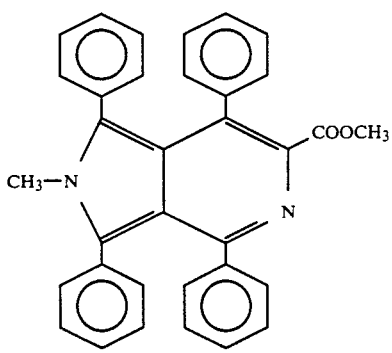
(21)
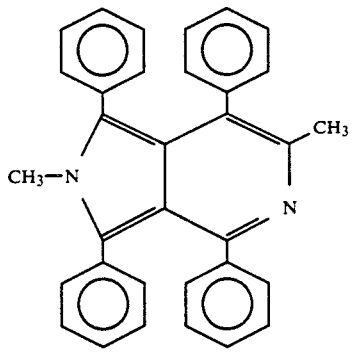
(22)
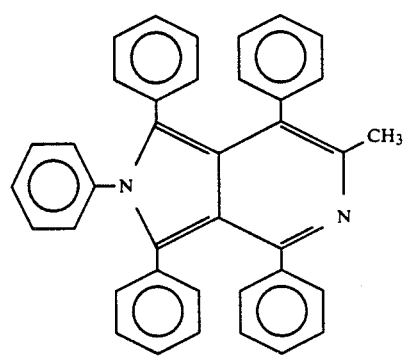
(23)

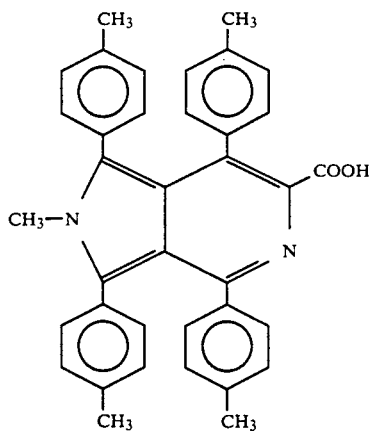
(24)
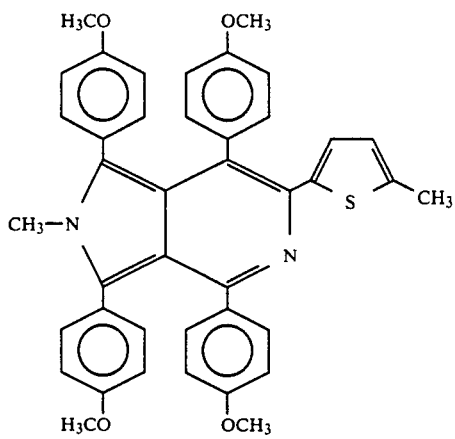
(25)
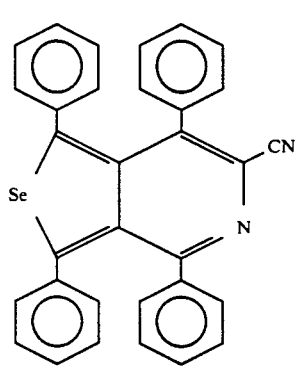
(26)
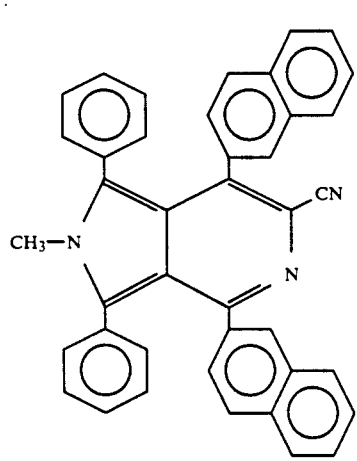
(27)

-continued
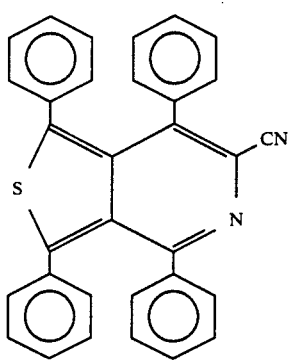
(28)
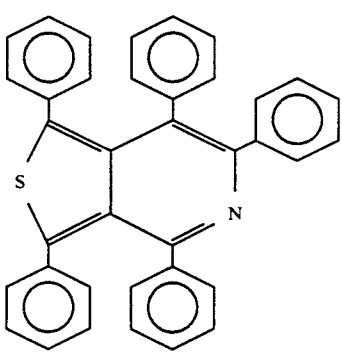
(29)
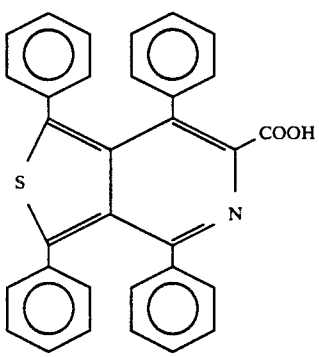
(30)
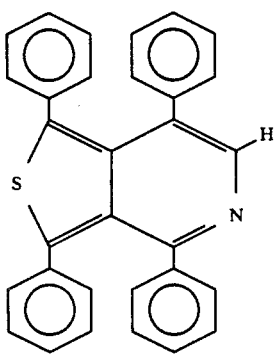
(31)

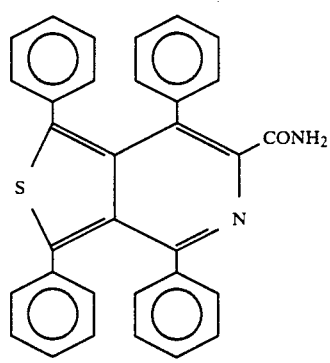
(32)
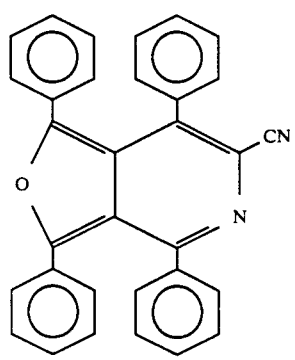
(33)
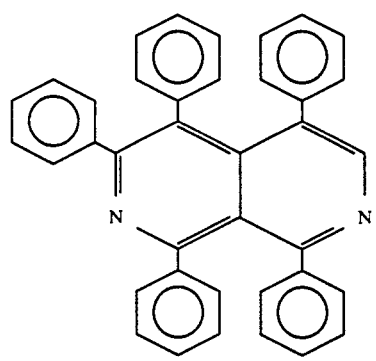
(34)
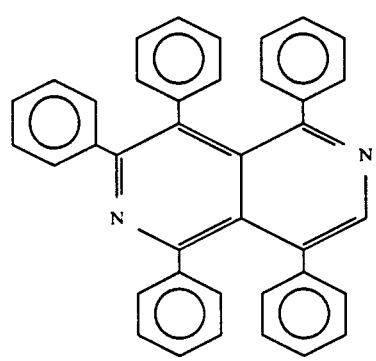
(35)

-continued
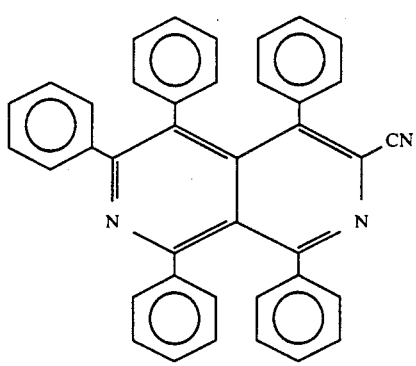
(36)
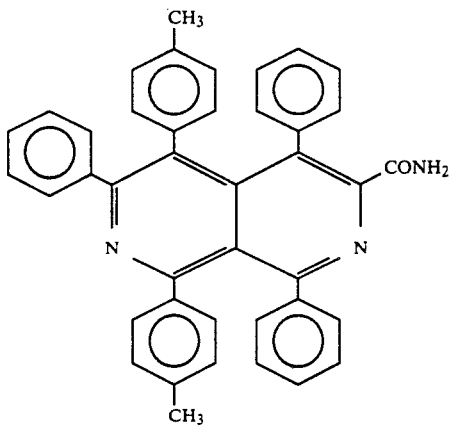
(37)
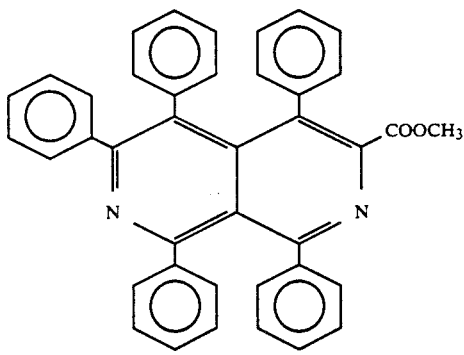
(38)
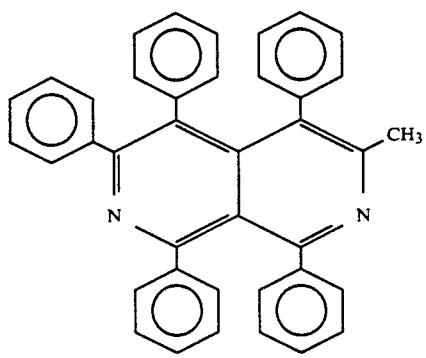
(39)

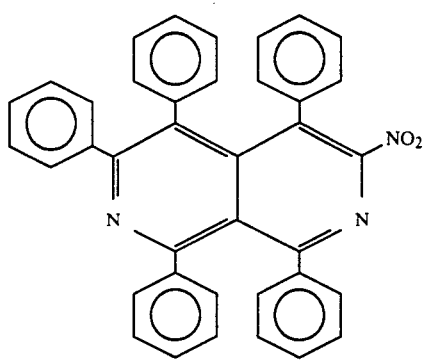
(40)
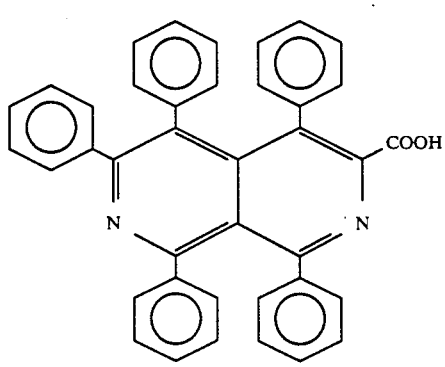
(41)
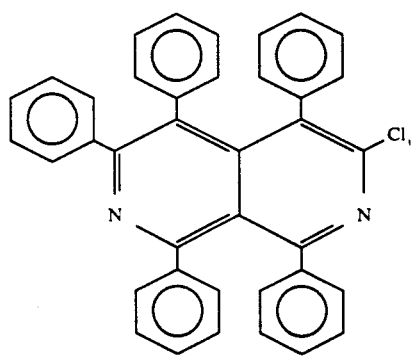
(42)
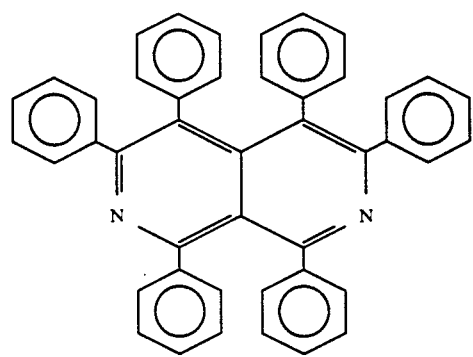
(43)

-continued
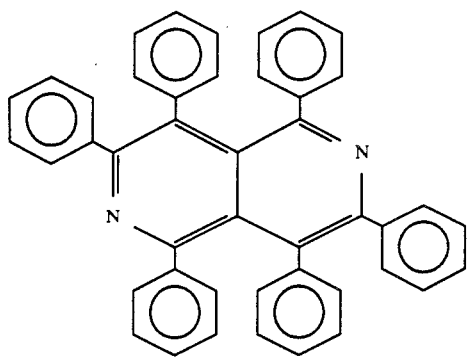
(44)
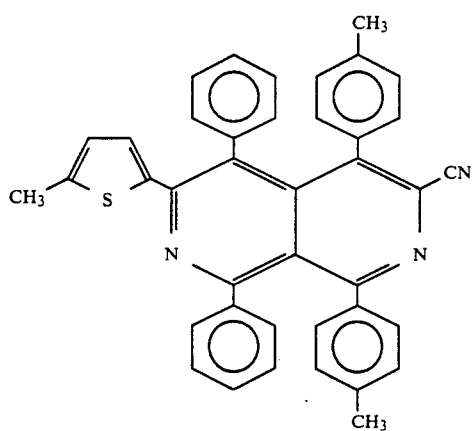
(45)
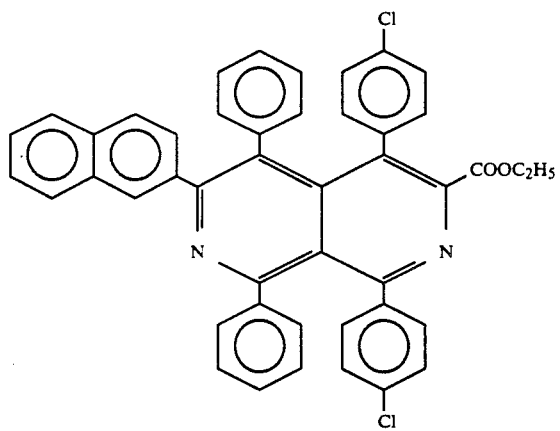
(46)
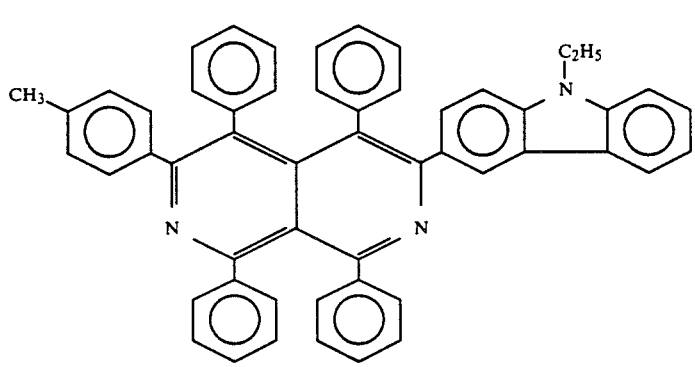
(47)

-continued
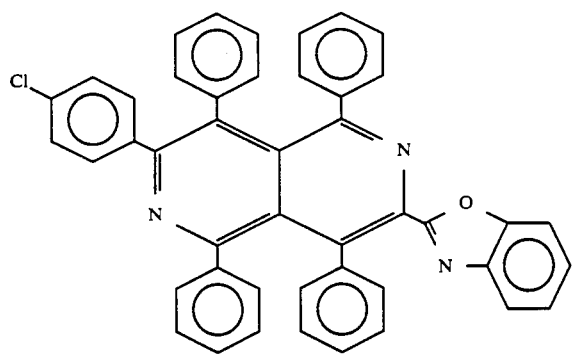
(48)
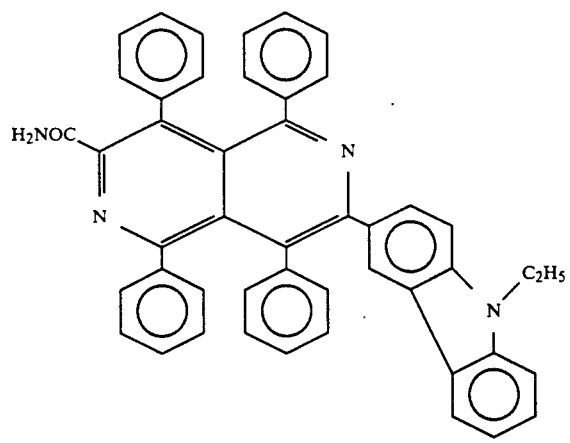
(49)
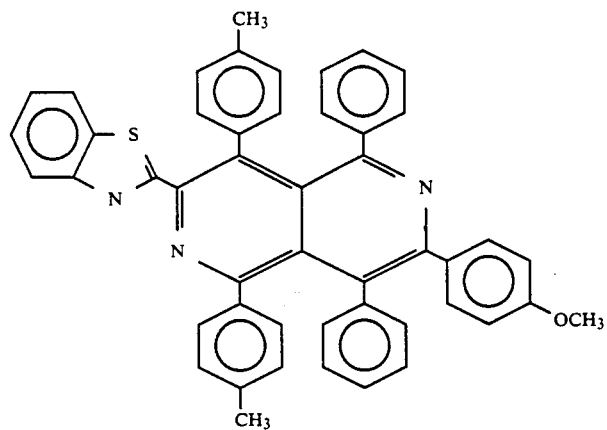
(50)
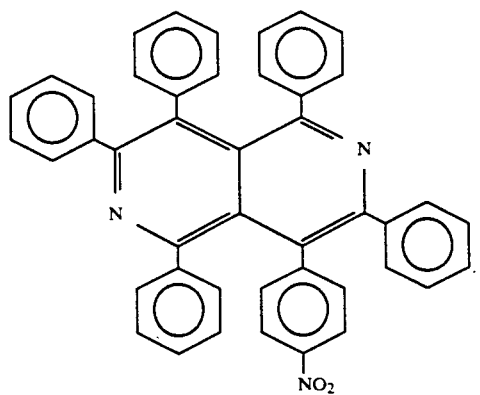
(51)
8. The electroluminescent device according to claim 1, wherein organic hole injection transparent layer contains N,N'-diphenyl-N,N'-(3-methylphenyl)-1,1'-diphenyl-4,4'-diamine, 1,1'-bis(4-di-p-tolylaminophenyl)cyclohexane, or 4,4'-bis(diphenylamino)quadrophenyl, as a hole injection transport compound.

9. The electroluminescent device according to claim 1, wherein an electron injection transport layer is interposed between the organic luminescent layer and the adjacent conductive layer.

* * * * *